Patented Mar. 26, 1929.

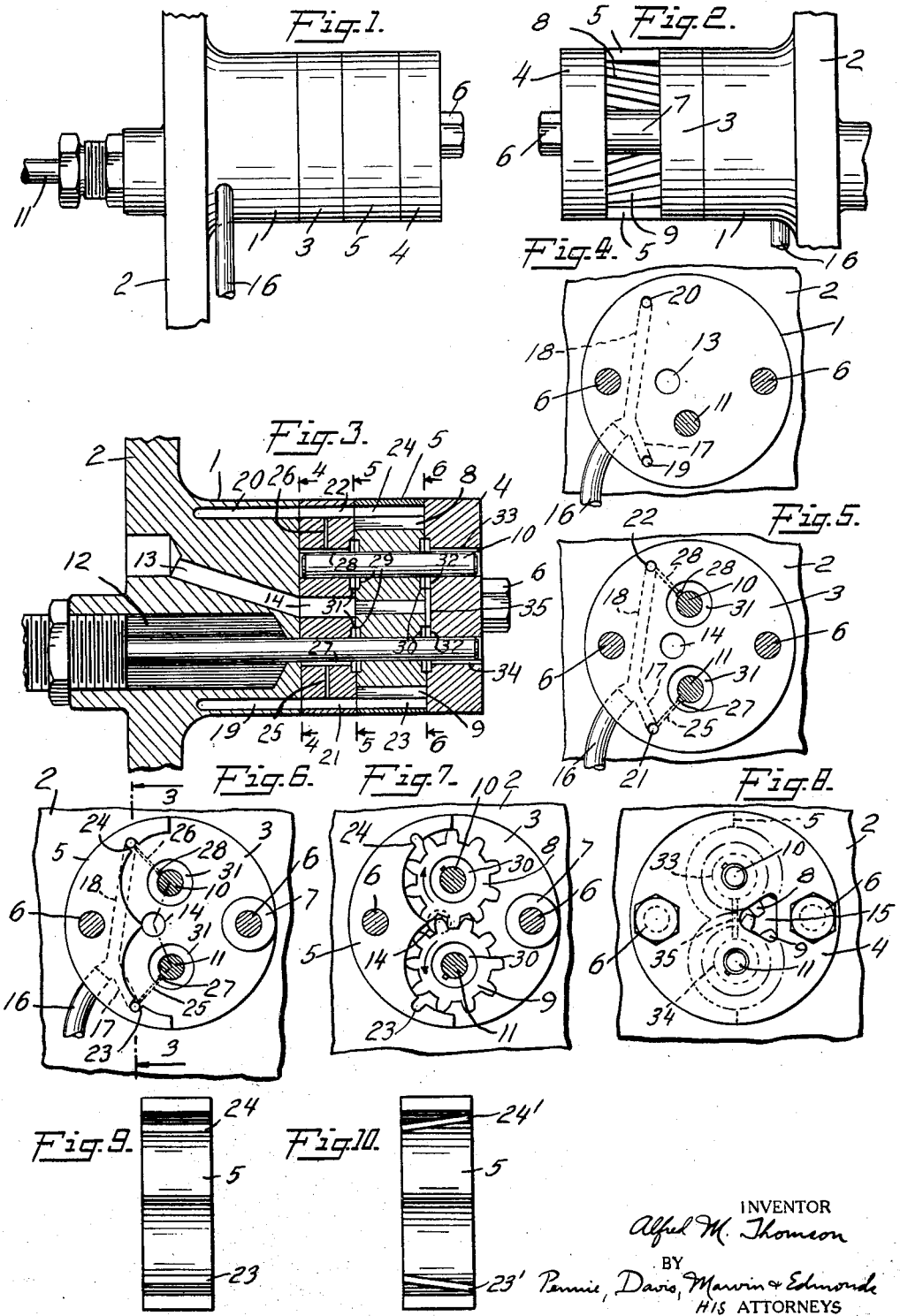

1,706,829

UNITED STATES PATENT OFFICE.

ALFRED M. THOMSON, OF NEWARK, NEW JERSEY, ASSIGNOR TO JOSEPH MERCADANTE, OF NEW YORK, N. Y.

PUMP.

Application filed May 28, 1928. Serial No. 281,006.

This invention relates to pumps, and more particularly concerns improvements in gear or rotary pumps of the general type described in the Groh Patent No. 1,495,411.

Gear pumps of the type described in the above mentioned patent comprise a pump chamber casing enclosing intermeshing spirally cut gears. In the operation of the pump, the fluid being pumped or compressed enters the spaces between the gear teeth as they disengage and the fluid is discharged from these spaces into the high pressure side of the system. As the gear teeth come into mesh, all of the fluid occupying the tooth spaces with the exception of the clearance spaces is expelled, and where a gas is being pumped, a suitable sealing fluid such as oil is relied upon to prevent communication between the high and low pressure sides of the pump system through the clearance spaces. A considerable quantity of sealing fluid is ordinarily employed for this purpose, and even at best there is some leakage of the pumped fluid from the high pressure side of the system to the low pressure side. The sealing fluid must be introduced to the proper points on the gear, and as the sealing fluid is usually employed to lubricate the moving parts of the pump, special means must be provided to conduct this fluid to all of the bearing surfaces.

Gear pumps of the type herein disclosed are used in refrigerating systems and in other forms of apparatus where comparatively high fluid pressures are required, and in order to maintain these pressures, the pumps must be operated at comparatively high speeds. It is therefore essential that a lubricant be continuously supplied to all of the bearing surfaces of the pump while it is in operation.

With the above and other considerations in mind, it is proposed in accordance with the present invention to provide a gear pump embodying means for introducing sealing fluid to the gear teeth and means for introducing a lubricant to the bearing surfaces of the pump. More specifically, it is proposed to provide a pump embodying certain passages, channels and recesses for conducting a sealing and lubricating fluid to the entire length of the gear teeth and to all of the bearings and other interengaging moving surfaces of the pump.

Various other specific objects, advantages and characteristic features of the invention will become apparent as the description thereof progresses.

In describing the invention in detail, reference will be made to the accompanying drawing, in which;

Figure 1 is a side elevation of a pump embodying the present invention;

Fig. 2 is an elevation similar to Fig. 1, showing the reverse side of the pump;

Fig. 3 is a vertical section through the pump, taken on the line 3—3 of Fig. 6;

Fig. 4 is a sectional side of the pump, taken along the line 4—4 of Fig. 3;

Fig. 5 is a sectional side of the pump, taken along the line 5—5 of Fig. 3;

Fig. 6 is a sectional view, taken along the line 6—6 of Fig. 3, with the pump gears removed;

Fig. 7 is a view similar to Fig. 6, with the pump gears in place;

Fig. 8 is an end view of the pump;

Fig. 9 is a side elevation of the segmental housing of the pump, showing the sealing fluid grooves therein; and Fig. 10 is a view similar to Fig. 9, showing a modified form of sealing fluid grooves.

Referring to the drawings, the pump is enclosed within a suitable casing, the pump base 1 being preferably formed integral with the casing wall 2. It will be understood that the pump casing is of any suitable size and shape, and completely surrounds the pump mechanism. In general, the pump comprises two bearing plates 3 and 4, connected to the base 1 and spaced apart by a segmental or arcuate housing 5, these parts being held together by suitable bolts 6, threaded into the base 1 and passing through aligned openings in the bearing plates 3 and 4 and in the arcuate housing 5. A spacing sleeve 7 is provided on one of the bolts 6 between the plates 3 and 4 as shown in Figs. 2 and 6. Two spirally cut gears 8 and 9 are carried in intermeshing relation on two parallel shafts 10 and 11 respectively, the gears being keyed or otherwise suitably fixed to these shafts. The shafts 10 and 11 are journaled in openings in the bearing plates 3 and 4, and the shaft 11 extends through the base 1 and out through a suitable fluid-tight packing or stuffing box 12 in the casing wall 2.

The segmental housing 5 is formed to fit closely around the gears 8 and 9 and acts with the bearing plates 3 and 4 to completely enclose half of the tooth surfaces of the two gears. A suitable inlet passage 13 is provided through the base 1, and a cooperating inlet port 14 extends through the bearing plate 3 at a point adjacent the center line between the gear axes and on the enclosed side of such line, as clearly shown in Figs. 6 and 7.

The outer bearing plate 4 is provided with a relief port 15 to permit the escape of fluid from between the gear teeth as they intermesh. As the gear teeth come together, any sealing fluid which may be carried in the tooth spaces of one gear is forced out through the relief port 15 by the entering teeth of the other gear.

Referring now more particularly to the passages for the sealing and lubricating fluid, which comprise important features of the present invention, the sealing fluid, preferably comprising a suitable type of oil, is drawn into the pump mechanism from the lower portion of the pump casing through the oil feed pipe 16 which communicates with two passages 17 and 18 in the pump base 1. The passages 17 and 18 may be drilled or cored in the base 1, or may take the form of grooves on the outer face of this base or on the inner face of the bearing plate 3. In the embodiment shown, the passages 17 and 18 respectively communicate with the longitudinal passages 19 and 20, which in turn communicate with the passages 21 and 22 in the bearing plate 3. The segmental housing 5 is provided with two sealing fluid grooves 23 and 24 extending respectively along the two arcuate surfaces thereof, these grooves being disposed in alignment with the passages 21 and 22 in the plate 3, as shown in Fig. 3. In a modified form of the apparatus, the sealing fluid grooves in the segmental housing 5 are spirally cut, as shown at 23' and 24' in Fig. 10, thus providing sealing fluid passages which follow and overlie the spiral gear teeth.

Two small oil passages 25 and 26 are provided in the bearing plate 3, extending from the longitudinal passages 21 and 22 to the oil grooves 27 and 28 respectively. The oil grooves 27 and 28 open into the shaft journal openings in the plate 3 and extend across the entire length of these journals, as shown in Figs. 3 and 5. In order to supply oil to the end surfaces of the gears which engage the bearing plates 3 and 4, the ends of the gears 8 and 9 are provided with annular oil grooves 29 and 30, and cooperating annular grooves 31 and 32 are provided in the faces of the plates 3 and 4 as shown in Fig. 3. The grooves 31 and 32 in the outer bearing plate 4 communicate respectively with two oil grooves 33 and 34 extending along the journal openings for the shafts 10 and 11 in this plate.

A groove or recess 35 is provided in the inner face of the outer bearing plate 4, extending vertically between the annular grooves 34 in this plate. This groove 35 preferably extends over the center line between gear axes as shown in Fig. 8, in order that the gear teeth may be in communication therewith immediately before and immediately after they are fully intermeshed.

The operation of the gear pump embodying the present invention will now be described. The shaft 11 is rotated by a suitable source of power, the gears 8 and 9 being thereby turned in the directions indicated by the arrows in Fig. 7. As each gear tooth is withdrawn from the mating tooth space adjacent the inlet port 14, fluid is drawn from the inlet port into the tooth space and is carried therein between the gear and the inner arcuate surface of the housing 5 and is finally discharged into the interior of the pump casing as the tooth space leaves the enclosure formed by the wall of the housing 5. As each fluid filled tooth space comes into registry with one of the grooves 23 or 24, a charge of sealing fluid flows into such tooth spaces. This sealing fluid is under the comparatively high pressure existing within the pump casing, and it therefore acts to compress the air within the tooth spaces as well as to form a liquid seal between the gear teeth and the adjacent housing walls and bearing plates.

When the gear teeth again intermesh, a certain amount of sealing oil is usually present in the tooth spaces. This oil is pressed from between the interengaging teeth through the relief port 15, and is also pressed into the groove or recess 35 in the bearing plate 4. As explained above, the groove 35 extends over the center line between the gear axes, and a very small quantity of sealing oil is thereby permitted to reenter the tooth spaces as the gear teeth disengage, thereby providing a film-like coating of oil on the gear teeth for sealing purposes. It should be noted that due to the spiral shape of the gear teeth, this coating of sealing oil which is reintroduced through the groove 35 is applied to each tooth space and cooperating tooth before the opposite or intake ends thereof have come into mating engagement. In other words, the end of each tooth space first comes into registry with the relief port 15 in the bearing plate 4, and a certain amount of oil is pressed therefrom by the mating tooth, the tooth space then registers with the groove 35 and a certain amount of oil is expelled therein, the tooth space passes beyond the center line and receives a small amount of sealing oil from the groove 35 and finally the opposite end of the tooth space under consideration, adjacent the inner bearing plate 3, comes into engagement with the mating tooth at this point.

The sealing oil is forced through the pipe 16 and the passages 17, 18, 19, 20, 21 and 22 by the fluid pressure within the pump casing. From the passages 21 and 22, oil flows through the passages 25 and 26 to the oil grooves 27 and 28 along the gear shaft journals and also flows into the annular recesses 29 and 31 at the inner ends of the gears. The oil which is pressed from the gear tooth spaces into the recess 35 in the bearing plate 4, passes along this recess and into the annular recesses 30 and 32 at the outer ends of the gears, and also enters the oil grooves 33 and 34 in the outer end plate journals of the gear shafts 10 and 11, these oil grooves being in communication with the recesses 32.

Thus the shaft journals as well as the end faces of both gears are thoroughly and completely lubricated as the pump is operated. The oil introduced to the tooth spaces through the openings 23 and 24 and the recess 35, serves to lubricate and seal the gear teeth.

The oil grooves 23 and 24 may extend horizontally across the inner face of the housing 5 as shown in Fig. 9, or may be spirally cut to conform with the shape of the gear teeth, as shown at 23' and 24' in Fig 10. When the straight grooves 23 and 24 are used, the sealing fluid is admitted to successive portions of each tooth space as the gears turn, while the spiral grooves 23' and 24' suddenly admit the oil to the entire length of each tooth space. The type of grooves employed depends upon the pumped fluid, the pressures to be obtained and various other factors.

From the description given, it will be readily apparent that the pump of the present invention includes means for supplying sealing fluid directly to all portions of the gear teeth, and further provides simple and efficient means for supplying a lubricant to all of the bearing surfaces of the pump.

Although the pump lubricating and sealing means of the present invention have been disclosed in connection with a single specific gear pump, it should be understood that certain variations and modifications may be made in the construction of the lubricating and sealing fluid passages, and that these passages may be applied to various type of rotary pumps, without departing from the scope of the invention as defined in the appended claims.

I claim:

1. In a pump, the combination with the pump chamber casing, of intermeshing spirally cut gears, means for introducing the pumped fluid into spaces between intermeshing teeth at one end of the gears, means for introducing a sealing liquid into said spaces, and end plates enclosing the ends of the gears and provided with bearings for said gears, the plate at the end of the gears remote from the point of admission of pumped fluid having a recess therein located at a point where the adjacent ends of the teeth fully intermesh, said recess being in communication with the bearings in said end plate.

2. In a pump, the combination with the pump chamber casing, of intermeshing spirally cut gears, means for introducing the pumped fluid into spaces between intermeshing teeth at one end of the gears, means for introducing a sealing liquid into said spaces, and end plates enclosing the ends of the gears and provided with bearings in which said gears are journaled, and means on the inner face of the plate at the end of the gears remote from the point of admission of pumped fluid for delivering sealing fluid forced from between intermeshed teeth to the bearings in said end plate.

3. In a pump, the combination with the pump chamber casing, of intermeshing spirally cut gears, means for introducing the pumped fluid into spaces between intermeshing teeth at one end of the gears, means for introducing a sealing liquid into said spaces, and means permitting escape of said liquid from between the teeth at a point where the opposite ends of the teeth are completely or fully intermeshed, said last mentioned means being also located to reintroduce a small quantity of sealing liquid into each pair of cooperating teeth as said opposite ends begin to separate and before their other ends come into registry with the point at which the pumped liquid is introduced.

4. In a pump, the combination with the pump chamber casing, of intermeshing spirally cut gears, means for introducing the pumped fluid into spaces between intermeshing teeth at one end of the gears, means for introducing a sealing liquid into said spaces, and end plates enclosing the ends of the gears, the plate at the end opposite the point of admission of pumped fluid having a relief recess therein located at the point at which the adjacent ends of the teeth are fully intermeshed, said relief recess being of sufficient breadth to permit a small quantity of sealing liquid to be reintroduced between cooperating teeth as they begin to separate and before said teeth come into registry with the point at which the pumped liquid is introduced into them.

5. In a pump, the combination with the pump chamber casing, of inner and outer spaced bearing plates, intermeshing spirally cut gears journaled between the spaced plates, means for introducing pumped fluid into spaces between intermeshing teeth at one end thereof, and means for compressing and sealing said fluid therein during a portion of the rotation of each pair of intermeshing teeth, the end faces of the said gears engaging the bearing plates being cut away at their centers to provide a comparatively narrow wearing surface on said gear ends and to facilitate sealing the pumped fluid in the spaces between the intermeshing teeth.

6. In a pump, the combination with the pump chamber casing, of inner and outer spaced bearing plates, intermeshing spirally cut gears journaled between the spaced plates, means for introducing pumped fluid into spaces between intermeshing teeth at one end thereof, and means for compressing and sealing said fluid therein during a portion of the rotation of each pair of intermeshing teeth, the end faces of the said gears engaging the bearing plates being cut away at their centers to provide a comparatively narrow wearing surface on said gear ends and to facilitate sealing the pumped fluid in the spaces between the intermeshing teeth, and means for supplying a sealing liquid to said cut away portions.

7. In a pump, the combination with the pump chamber casing, of inner and outer spaced bearing plates, intermeshing spirally cut gears journaled between the spaced plates, means for introducing pumped fluid into spaces between intermeshing teeth at one end thereof, and means for compressing and sealing said fluid therein during a portion of the rotation of each pair of intermeshing teeth, one face of each pair of abutting faces of the gears and plates having its central portion cut away to reduce the wearing surface between the gears and plates and provide a cavity for the reception of a sealing and lubricating medium.

8. In a pump, the combination with the pump chamber casing, of intermeshing spirally cut gears, means for introducing the pumped fluid into spaces between intermeshing teeth at one end of the gears, and means for introducing a sealing medium into the space between adjacent teeth of the gears at a plurality of points longitudinally of the gears.

9. In a pump, the combination with the pump chamber casing, of intermeshing spirally cut gears, means for introducing the pumped fluid into spaces between intermeshing teeth at one end of the gears, and means for introducing a sealing medium into the space between adjacent teeth of the gears at points located adjacent both ends of the gears.

10. In a pump, the combination with the pump chamber casing, of intermeshing spirally cut gears, a bearing plate at each end of the gears, a segmental housing intermediate said plates partially enclosing the gears, means for introducing the pumped fluid into the spaces between intermeshing teeth at one end of the gears, and means for introducing a sealing liquid into the spaces between said teeth, said last mentioned means comprising a duct in said segmental housing extending longitudinally of the gears and communicating with the spaces between the gear teeth at a plurality of points longitudinally of said gears.

In testimony whereof I affix my signature

ALFRED M. THOMSON.